W. LÖW.
APPARATUS FOR CONSECUTIVELY AFFIXING SERIAL VIEWS TO FILM BANDS.
APPLICATION FILED AUG. 31, 1915.

1,273,113.

Patented July 16, 1918.
2 SHEETS—SHEET 1.

Witnesses:—
D. F. Schilling
Hermann Kunz

Inventor:—
Wilhelm Löw
by
his attorney.

W. LÖW.
APPARATUS FOR CONSECUTIVELY AFFIXING SERIAL VIEWS TO FILM BANDS.
APPLICATION FILED AUG. 31, 1915.
1,273,113.
Patented July 16, 1918.
2 SHEETS—SHEET 2.
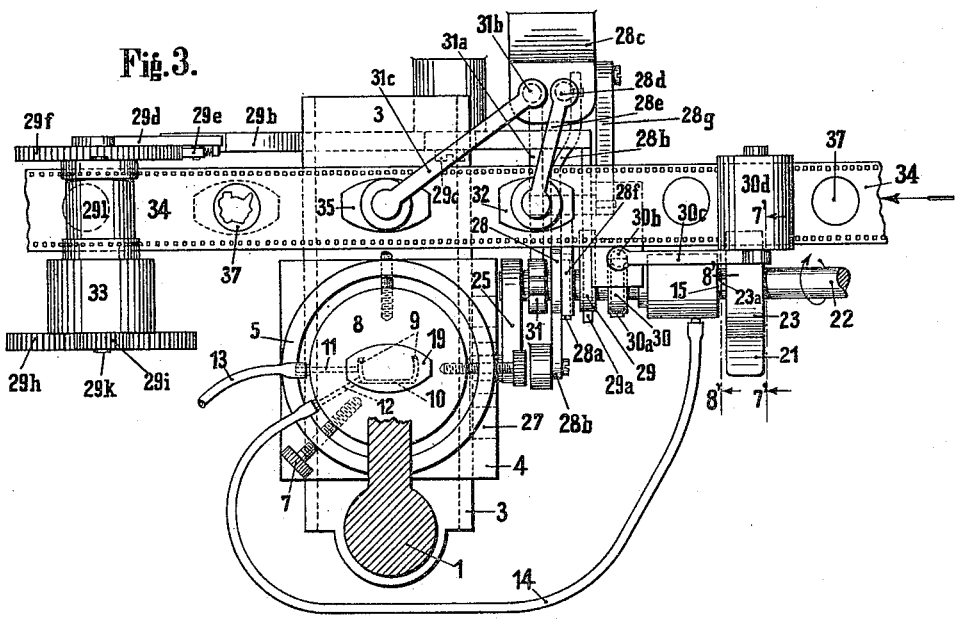
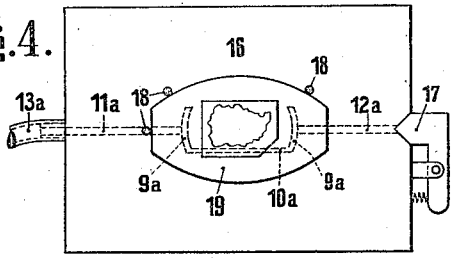
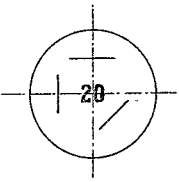
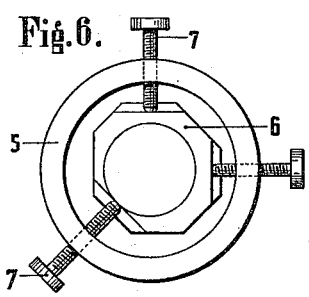
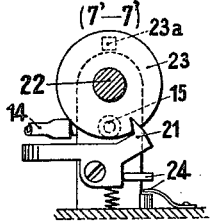
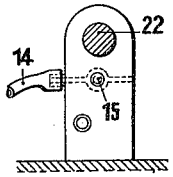
Inventor:—
Wilhelm Löw

UNITED STATES PATENT OFFICE.

WILHELM LÖW, OF HEIDELBERG, GERMANY.

APPARATUS FOR CONSECUTIVELY AFFIXING SERIAL VIEWS TO FILM-BANDS.

1,273,113. Specification of Letters Patent. Patented July 16, 1918.

Application filed August 31, 1915. Serial No. 48,336.

*To all whom it may concern:*

Be it known that I, WILHELM LÖW, a subject of the German Emperor, and residing at Heidelberg, Germany, have invented certain new and useful Improvements in Apparatus for Consecutively Affixing Serial Views to Film-Bands, of which the following is a specification.

It has already been proposed to make extensional structures or spatial organisms, for instance a nerve tract, illustrative and adaptable for purposes of instruction by preparing a series of microsections of the respective object, photographically taking each such section, and then kinematographically reproducing the consecutively arranged section pictures.

The present invention has reference to an apparatus for consecutively transferring the sections to be exposed to a film band in the order they are delivered by the microtome; and the apparatus essentially comprises a microscope with cross-threads and adjustable stage, means for traveling the film band horizontally in the rear of the microscope, and means for transferring and affixing the mounts to the film band.

Figure 1:
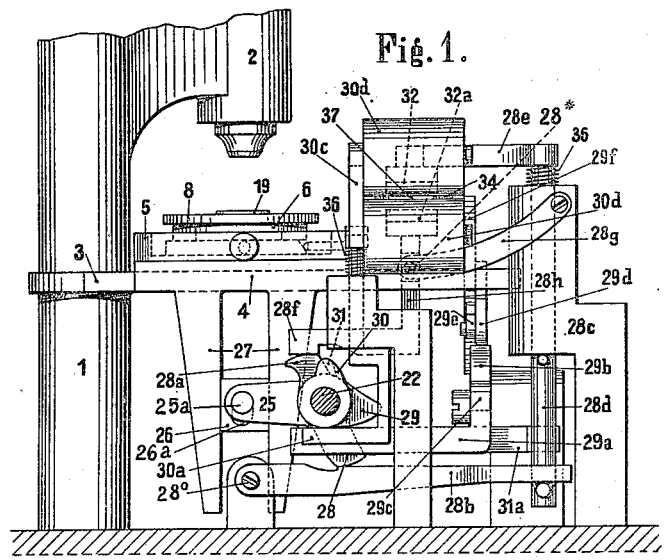

The nature of my invention will best be understood when described in connection with the accompanying drawings, in which Figure 1 represents a side elevation of the essential parts of the apparatus, Fig. 2 a front view thereof without the microscope, and Fig. 3 a top view; Fig. 4 shows a plan of the stage of an auxiliary loop; Fig. 5 shows the scheme of the hair-cross; Fig. 6 represents the centering mechanism of the object table, and Figs. 7 and 8 show respectively sections on lines 7'—7' and 8'—8' of Fig. 3.

The object to be cut up, and the obtained microsections of which are then to be affixed on a strip of film in continued succession in the order they are made by the microtome, is embedded in a prismatic block of paraffin or the like, which conveniently may be provided with a plurality, say three, of colored threads, arranged in a scalene and extending rectangularly to the plane of section.

With objects, from which the embedding medium need not be removed prior to staining, these colored threads may be dispensed with, and two or more edges or corners of the microsections may be used as guiding marks, provided the object block has a definite prismatic shape, so that all sections are absolutely congruent and a mistaking of the edges is excluded, for instance a rectangle with a sliced-off corner. The block with the embedded object is then sliced into a series of microsections, which are singly attached to object carriers or mounts and the latter then affixed to the film band.

From the pillar 1 of the microscope 2 extends horizontally the plate 3 of dovetailed cross section which supports the sliding carriage 4. To the latter is secured an annulus 5 (Fig. 6) within which a prismatic block 6 is adjustable in all directions in the horizontal plane by means of the micrometer screws 7. This block in turn supports the circular rotatable stage 8, the upper face of which is provided with two grooves 9 (Fig. 3) communicating by the cross-duct 10. From the one groove 9 lead two ducts 11 and 12 to the edge of the stage, of which the duct 11 is connected by flexible tubing 13 to an air pump, not specially shown; and the duct 12 is connected by the tube 14 with an air valve 15 (Figs. 3 and 8). In similar manner a glass table or stage 16 (Fig. 4) of an auxiliary magnifying glass is provided with grooves $9^a$ which communicate by the cross-duct $10^a$. The one groove $9^a$ communicates by duct $11^a$ and the flexible tube $13^a$ with the air pump and the duct $12^a$, communicating with the other groove $9^a$, is ordinarily closed at its outer orifice by a spring actuated valve 17. From the loop table rise three pins 18 which serve as marking stops or guides for the object mount, and to the underside of the table is centrically affixed a figure or mask in black paper conforming in size and shape to the microsections.

Each microsection, as it comes from the microtome, is first roughly centered by eyesight under the loop on the slide or mount. These latter are thin, flexible mica sheets in the shape of an ellipse with the ends cut off, which form allows of the mounts being variously displaced for centering purposes without fear of encroaching on the marginal feed perforations in the film, so that relatively narrow film bands can be used. For rough-centering the microsection on its mount, the latter is located on the stage 16 in contact with the marking pins 18, and the air pump is started, which causes the air in the grooves $9^a$ to be rarefied, with the result that the mount is sucked fast. The section is then placed on the mount so that it coincides with the black paper mask on the underside of the glass stage 16, is affixed and stained, if required, and the mount is then freed again by opening the valve 17, which causes air to enter the grooves $9^a$ for breaking the air lock. The mount is then removed to the microscope for fine-adjustment.

In the field of vision of the microscope is provided a thread- or hair-cross 20 (Fig. 5), whose threads can be individually adjusted rectangularly to their direction in suitable manner, for instance by micrometer screws, not specially shown here. In the center portion of the stage 8 is engraved a figure in the contours of the mounts. The mount carrying the first section is now roughly centered on the stage 8 and is held thereon by suction, as above described in connection with the auxiliary magnifying device. The thread-cross is then orientated by the colored dots, represented by the cross sections of the longitudinally extending colored threads in the paraffin block, or by the edges of the microsection, and then remains in the determined position for adjusting the succeeding microsections. After each microsection is thus fine-adjusted, a spring actuated pawl 21 (Figs. 2, 3 and 7) is manually operated to free the notched disk 23, fixed on the shaft 22, which latter is driven in suitable manner, for instance by an electric motor, not shown. The actuation of this pawl, as described, serves to close an electric circuit at 24 (Fig. 7), which then starts the motor to rotate the shaft 22. After a full revolution of the disk 23, the pawl drops into the peripheral notch again, the current is interrupted at 24, and the motor stops. To the shaft 22 of the latter is secured a crank 25 whose projection $25^a$ extends into a slot $26^a$ in the slide block 26, which latter is guided in a bracket-bearing 27 depending from the carriage 4. Upon rotation of shaft 22, the carriage 4 with the stage 8, obviously, will be reciprocated on the plate 3. On the shaft 22 are further fixed the cams 28, $28^a$, 29, 30 and 31. The cam 28 coöperates with the lever $28^b$, which is pivoted at $28^c$ and co-acts with its free end with the slide rod $28^d$, which is guided in the upright $28^e$ and carries at its upper end a laterally extending arm $28^a$, to the front end of which is secured the stamp 32. The cam $28^a$ coöperates with the arm $28^f$ laterally extending from the vertically guided rod $28^h$, to which latter is connected by a pin and slot connection $28^*$ the swing arm $28^g$ pivoted to the upright $28^c$. The upper end of the rod $28^h$ supports a counter stamp $32^a$. The cam 29 operates the two-armed lever $29^a$, $29^b$ which is pivoted at $29^c$ and extends with its angularly bent arm $29^a$ below said cam and with the free end of its portion $29^b$ below the head of a swing lever $29^d$, which latter is pivotally secured on the upright 33 and carries a spring pawl $29^e$ coöperating with a ratchet wheel $29^f$, which latter is fixed on the shaft $29^g$ journaled in the standard 33. On this shaft is further secured a large toothed wheel $29^h$ which meshes with the smaller toothed wheel $29^i$. This latter is fixed on the shaft $29^k$ of a drum $29^l$, near the peripheral edges of which are provided the feeding pins which on operation of the device successively engage in the edge perforations in the film band 34 and thereby advance the latter in well known manner in coöperation with a counter-drum $29^m$.

Figure 2:
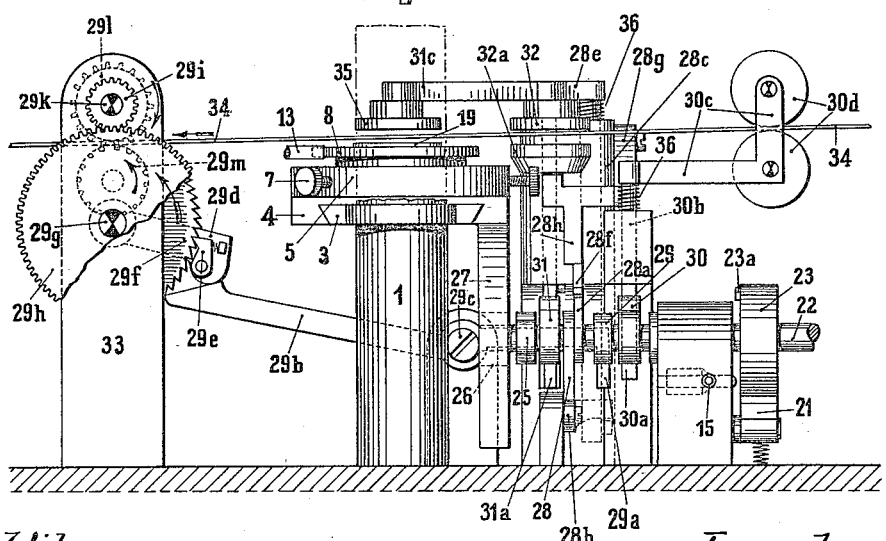

On the up-movement of the lever $29^b$, the wheels $29^f$, $29^h$ and $29^i$, as well as the two feed drums $29^l$ and $29^m$ will be advanced a certain distance by the aid of the levers $29^d$ and the pawl $29^e$ in the direction of the arrows in Fig. 2, and the film band 34 is correspondingly advanced. The cam 30, by the aid of the arm $30^a$ and the rod $30^b$, operates the angle-arm $30^c$ which is secured to the upper end of the rod $30^b$ and journals two rollers $30^d$ between which passes the film 34. The cam 31 operates by means of the arm $31^a$ and the rod $31^b$, which is vertically guided in the upright $28^c$, the stamp 35 which is held by the arm $31^c$, extending from said rod $31^b$, above the film and the plate 3 (Fig. 2). Upon the several cams releasing their respective coöperating parts, compression springs 36 carry the latter back to their initial positions.

The operation of the mechanisms described is as follows: The air pump is started, which causes the mount 19 to be sucked fast onto the stage 8. After the mount has been adjusted in proper position, as above described, the pawl 21 is disengaged from the disk 23, which starts the motor; the carriage 4 with the stage 8 and the immobilized mount 19 is then moved toward the rear until the latter has arrived below the film band 34. Meanwhile the stamp 32 is let down and the moistened counterstamp $32^a$ is raised, whereby the film, which previously had been provided with a suitable adhesive, is moistened at the portions where later the ends of the mount 19 are to contact. The film 34 is then advanced the distance from stamp 32 to stamp 35; the stage 8 now has reached its rearmost position which is maintained during the following operations. The rollers $30^d$ descend with the film until the latter touches the mount 19. Hereupon the stamp 35 descends and presses the film 34 onto the mount, so that the latter two securely stick together. Simultaneously the valve 15 of the air conduit 14 is opened for a brief space of time by the passage of the wart $23^a$ on disk 23, which breaks the air lock between the stage and the mount and releases the latter. The stamp 35 and the rollers $30^d$ with the film 34 and the mount 19 affixed thereto then ascend again and the stage 8 returns to its initial position, when the pawl 21 snaps back into the disk notch, which stops the motor. A second mount is now placed on the stage, the latch 21 is disengaged again, and the described operations are repeated.

In place of the levers and arms operated by the cams as shown, it may be found convenient to use such as are provided with laterally extending pins or rollers adapted to engage in cam grooves provided in the side faces of eccentrics, when the complete operation—that is to say, also the return movement into the position of rest, is effected by the eccentrics. Or eccentrics with lateral projections or with peripheral grooves may be used for the purposes indicated.

The film band 34 is provided down the center portion with equidistantly spaced apart cut-outs 37, large enough to house the microsections. As shown, these cut-outs are circular, but they may, obviously, also have any other suitable contour. Since the microsections, even when covered by very thin mica plates, are no thicker than the film band, they will not appreciably be raised above the latter and are fully protected against damage when wound upon reels of large diameter.

The feeding drums $29^1$ and $29^m$ are reduced at their middle portion to prevent the mounts from coming in contact with the drum periphery.

The film band, as stated, is previously provided at the proper places with a suitable adhesive, which dries on and is momentarily softened again by being wetted by the counterstamp $32^a$.

The described procedures, the centering of the microsections by the marking points or lines under the microscope, and the affixing of the mounts to the film band in the proper position thereon and equidistantly from one another, result in the production of a correct kinematographic picture. From the original film thus built up, the exposures are then made, the individual pictures being crowded together by feeding the taking film always a shorter distance than the original film.

The apparatus can also be constructed with the axis of the microscope extending horizontally and the film band perpendicularly.

What I claim is:—

1. In apparatus for consecutively affixing serial views to a film band, in combination, a sliding carriage, a stage adjustably mounted on said carriage, means for holding and centering the mounts carrying the views on said stage, means for automatically moving said carriage with said stage below the film band, means for automatically affixing the mounts to the film band, and means for automatically intermittently advancing the film band.

2. In apparatus for consecutively affixing serial views to a film band, in combination, a sliding carriage, a stage adjustably mounted on said carriage, grooves provided in the upper face of said stage so as to be covered by one of the view mounts located thereon, means for sucking off the air contained in said grooves, means for feeding air into said grooves, means for automatically affixing the mounts to the film band, and means for automatically intermittently advancing the film band.

3. In apparatus for consecutively affixing serial views to a film band, in combination, a sliding carriage, a stage adjustably mounted on said carriage, an auxiliary magnifying glass having a glass table, grooves provided in the upper face of said table so as to be covered by one of the view mounts located thereon, means for sucking off the air contained in said grooves, means for feeding air into said grooves, marking stops also provided on said table, means for holding and centering the view mounts on said stage, means for automatically affixing the mounts to the film band, and means for automatically intermittently advancing the film band.

4. In apparatus for consecutively affixing serial views to a film band, in combination, a sliding carriage, a stage adjustably mounted on said carriage, means for automatically moving said carriage with said stage below the film band, feeding drums and guiding rollers for the film band, means for automatically intermittently rotating said feeding drums and advancing the film band, means for lowering and raising said guiding rollers with the film band, a stamp and a moistened counter-stamp movably mounted above and below the film band respectively, a third stamp also movably mounted above the film band and in the rear of said stage, means for lowering and raising said stamps, a rotatable shaft, and means for transmitting movement from said shaft to said means for operating said carriage, drums, rollers and stamps.

In testimony whereof I affix my signature in presence of two witnesses.

WILHELM LÖW.

Witnesses:
 AUGUST OHMINENS,
 CHESTER BROWN.

Copies of this patent may be obtained for five cents each, by addressing the "Commissioner of Patents, Washington, D. C."